United States Patent [19]

Abdulally

[11] Patent Number: 4,936,770
[45] Date of Patent: Jun. 26, 1990

[54] SULFUR SORBENT FEED SYSTEM FOR A FLUIDIZED BED REACTOR

[75] Inventor: Iqbal F. Abdulally, Randolph, N.J.

[73] Assignee: Foster Wheeler Energy Corporation, Clinton, N.J.

[21] Appl. No.: 275,823

[22] Filed: Nov. 25, 1988

[51] Int. Cl.$^5$ .......................... F27B 15/00; F27B 1/00
[52] U.S. Cl. ...................................... 432/58; 110/245; 122/4 D
[58] Field of Search .................... 432/58, 15; 110/245; 122/4 D

[56] References Cited

U.S. PATENT DOCUMENTS

| | | |
|---|---|---|
| 3,902,462 | 9/1975 | Bryers . |
| 4,184,456 | 1/1980 | Taylor et al. . |
| 4,249,470 | 2/1981 | Vatsky . |
| 4,275,668 | 6/1981 | Daman . |
| 4,411,879 | 10/1983 | Ehrlich et al. ......................... 110/245 |
| 4,424,766 | 1/1984 | Boyle ..................................... 110/245 |
| 4,434,726 | 3/1984 | Jones . |
| 4,474,119 | 10/1984 | Jones . |
| 4,476,790 | 10/1984 | Borio et al. . |
| 4,552,203 | 11/1985 | Chrysostsme et al. ............. 122/4 D |
| 4,597,774 | 7/1986 | Garcia-Mallol et al. . |
| 4,829,912 | 5/1989 | Alliston et al. ........................ 110/245 |

Primary Examiner—Henry C. Yuen
Attorney, Agent, or Firm—Marvin A. Naigur

[57] ABSTRACT

A fluidized bed reactor in which a bed of solid particulate material including fuel is provided in a furnace section and air is introduced into the bed at a velocity sufficient to fluidize the particulate material and support the combustion of the fuel. A separator separates the entrained particulate material from a mixture of the air and the gaseous products of the combustion. The separator is connected to the furnace section for returning the separated particulate material back to the bed. Relatively coarse sorbent and relatively fine sorbent material are passed into the furnace section at two separate locations, respectively.

3 Claims, 1 Drawing Sheet

SULFUR SORBENT FEED SYSTEM FOR A FLUIDIZED BED REACTOR

BACKGROUND OF THE INVENTION

This invention relates to a fluidized bed reactor in which heat is generated by the combustion of fuel in a fluidized bed, and, more particularly, to a sulfur sorbent feed system for the reactor.

Fluidized bed reactors, combustors, or gasifiers, are well known. In these arrangements, air is passed through a bed of particulate material, including a fossil fuel such as coal and an adsorbent for the sulfur generated as a result of combustion of the coal, to fluidize the bed and to promote the combustion of the fuel at a relatively low temperature. When the heat produced by the fluidized bed is utilized to convert water to steam, such as in a steam generator, the fluidized bed system offers an attractive combination of high heat release, high sulfur adsorption, low nitrogen oxides emissions and fuel flexibility.

The most typical fluidized bed combustion system is commonly referred to as a bubbling fluidized bed in which a bed of particulate materials is supported by an air distribution plate, to which combustion-supporting air is introduced through a plurality of perforations in the plate, causing the material to expand and take on a suspended, or fluidized, state. In the vent the reactor is in the form of a steam generator, the walls of the reactor are formed by a plurality of heat transfer tubes. The heat produced by combustion within the fluidized bed is transferred to a heat exchange medium, such as water, circulating through the tubes. The heat transfer tubes are usually connected to a natural water circulation circuitry, including a steam drum, for separating water from the steam thus formed which is routed to a turbine to generate electricity or to a steam user.

In an effort to extend the improvements in combustion efficiency, pollutant emissions control, and operation turn-down afforded by the bubbling bed, a fluidized bed reactor has been developed utilizing a fast, or circulating, fluidized bed. According to this technique, fluidized bed densities are attained which are well below those of a typical bubbling fluidized bed. The formation of the low density circulating fluidized bed is due to its small particle size and to a high solids throughput, which requires high solids recycle. The velocity range of a circulating fluidized bed is between the solids terminal, or free fall, velocity and a velocity which is a function of the throughput, beyond which the bed would be converted into a pneumatic transport line.

Although the circulating fluidized bed enjoys several operational advantages when compared to the bubbling fluidized bed it is not without problems. For example, the sorbent material introduced into the bed is usually of only one particle size. This limits fuel flexibility and causes excessive flyash and bed chemistry problems resulting in sintering and agglomeration. Also, the use of sorbent material of the same particle size causes relatively slow start-ups and load change capability since the solids inventory and the furnace combustor cannot be adjusted rapidly as demanded by the operational requirements.

SUMMARY OF THE INVENTION

It is, therefore, an object of the present invention to provide a sorbent injection system for a fluidized bed reactor which enables sorbent of varying particle sizes to be introduced into the reactor.

It is a further object of the present invention to provide a sorbent feed system of the above type which permits a greater variety of fuels to be used.

It is a further object of the present invention to provide a system of the above type which minimizes the amount of flyash produced in the reactor.

It is a further object of the present to provide a sorbent feed system of the above type in which the ratio of adsorbent between the bed and the upper furnace/combustor can be varied to improve operational characteristics.

It is a further object of the present invention to provide a sorbent feed system of the above type which permits faster start-ups and load changes.

It is a further object of the present invention to provide a sorbent feed system of the above type in which bed chemistry problems are avoided by offsetting the chemical balance in the bed.

It is a further object of the present invention to provide a system of the above type in which the solids inventory in the furnace combustor can be adjusted rapidly as demanded by the operational requirements.

Toward the fulfillment of these and other objects the system of the present invention comprises a reactor containing a bed of solid particulate fuel material and sulfur sorbent material. Air is introduced into the bed at a velocity sufficient to fluidize the particulate material and support the combustion of the fuel. A separating section is provided for receiving a mixture of the air, the gaseous products of combustion, and the particulate material entrained thereby. The separating section separates the particulate material from the mixture and the separated particulate material is returned back to the bed. Relatively coarse sorbent and relatively fine sorbent material are introduced into said combustor at two separate locations.

BRIEF DESCRIPTION OF THE DRAWINGS

The above brief description, as well as further objects, features and advantages of the present invention will be more fully appreciated by reference to the following detailed description of the presently preferred, but nonetheless, illustrative embodiments in accordance with the present invention when taken in conjunction with the accompanying drawings wherein.

DESCRIPTION OF THE PREFERRED EMBODIMENT

Figure 1:
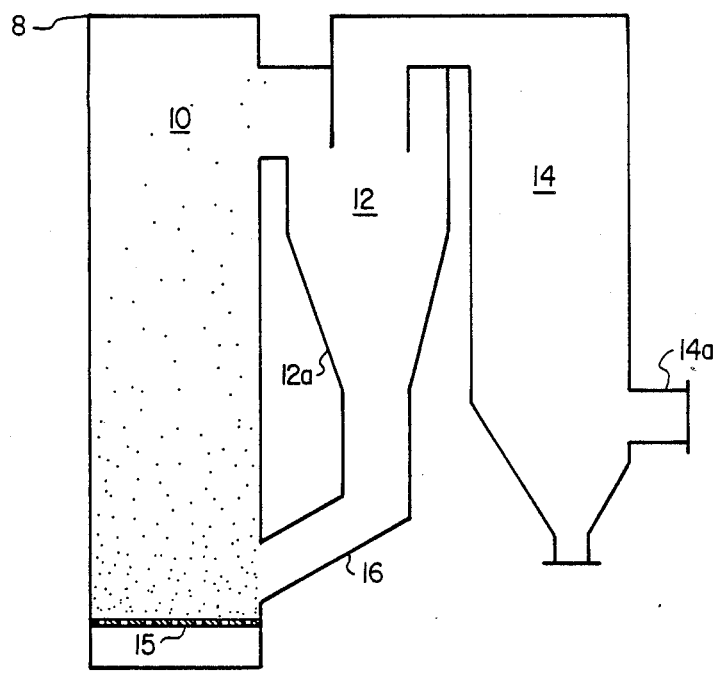
FIG. 1 is a schematic front view of a fluidized bed reactor.

Referring to FIG. 1 of the drawings, the reference numeral 8 refers in general to a fluidized bed reactor, in the form of a steam generator, which includes a furnace section 10, a separator 12 and a heat recovery area 14. An air distributor, or grate, 15 is provided in the lower portion of the furnace section 10 for reasons that will be described. The separator 12 is in the form of a cyclone separator which receives a mixture of air and the products of combustion from the furnace section 10 along with the solid particles entrained thereby. The separator 12 operates to separate the solids from the gases, and the latter are passed to the heat recovery area 14. The solids from the separator 10 fall down into a hopper section 12a of the separator where they are reinjected, via a recycle conduit 16, to the lower portion of the furnace section 10. The gases, after passing through the heat recovery area 14 exit therefrom via an outlet conduit 14a. Since the above mentioned components and techniques are conventional, they will not be described in any further detail.

Figure 2:
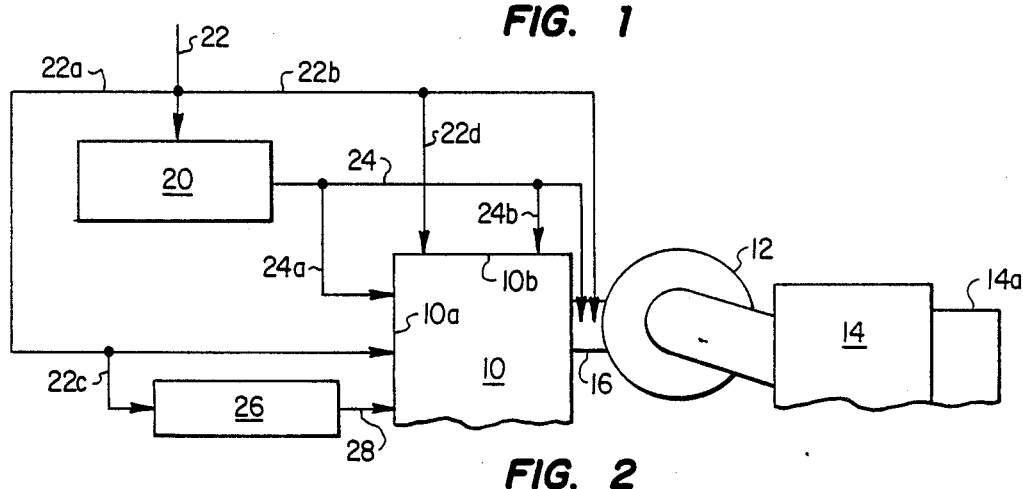
FIGS. 2 & 3 are schematic plan views of two embodiments of the sorbent injecting system of the present invention utilized in connection with the reactor of FIG. 1.

FIG. 2 depicts the components of FIG. 1 shown in connection with the sorbent feed system of the present invention. The sorbent feed system includes a pulverizer 20 which receives sorbent from an inlet pipe 22 which is connected to a source of the sorbent. The crushed sorbent from the pulverizer 20 is fed, via a conduit 24, to the recycle conduit 16.

A pair of branch conduits 24a and 24b are connected to the conduit 24 and, in turn, introduce the sorbent to the furnace section 10, via a front wall 10a and a side wall 10b preferably at the lower portion of the furnace section. The inlet supply conduit 22 branches into two conduits 22a and 22b, with the conduit 22a extending to the front wall 10a of the furnace section 10 and the conduit 22b extending to the recycle conduit 16. A branch conduit 22c extends from the conduit 22a to a coal crusher 26. The sorbent from the branch conduit 22c is combined with the coal in the crusher 26 and the mixture introduced into the furnace section 10 via a conduit 28 and the wall 10a.

A branch conduit 22d extends from the conduit 22b to the wall 10b of the furnace section 10 for introducing the relatively coarse sorbent into the fluidized bed in the furnace section. Thus, a relatively coarse material is introduced, via the branch conduit 22a into the furnace section 10 and, via the conduit 22b, into the recycle conduit 16. Also, relatively coarse material is passed, via the branch conduit 22a and the branch conduit 22c into the coal crusher 26 where it is combined with the fuel material in the crusher 26 and is passed, via the conduit 28, into the furnace section 10. Sorbent of a relatively small particle size from the pulverizer 20 is introduced, via the conduit 24, into the recycle conduit 16, and, via the branch conduits 24a and 24b, into the furnace section 10 via the walls 10a and 10b, respectively.

Figure 3:
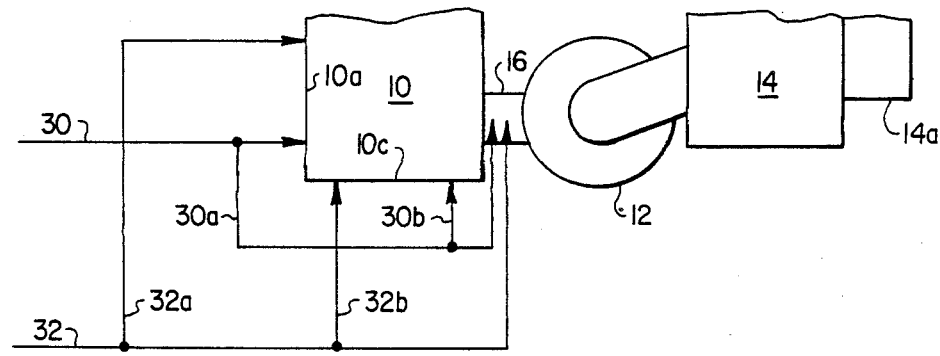

The embodiment of FIG. 3 is similar to that of FIG. 1 but utilizes separate sources of relatively fine sorbent and coarse sorbent which are introduced, via conduits 30 and 32, to the furnace section 10 via the wall 10c, and to the recycle conduit 16, respectively. A branch conduit 30a extends from the conduit 30 and to the recycle conduit 16, while a branch conduit 30b extends from the conduit 30a to the furnace section 10, via the wall 10c. Also, branch conduits 32a and 32b extend from the conduit 32 into the furnace section 10 via the walls 10a and 10b.

It is understood that the sorbent material, although generally coarse or fine in accordance with the foregoing, may have a size distribution within a desirable range. Also, it is understood that the crusher/pulverizer 20 of the embodiment of FIG. 2 can be adapted to vary the size distribution within a desirable range which can be accomplished either on or off-line adjustment to the operation of the crusher pulverizer.

It is also understood that long term storage silos and day bins may be provided for the storage of the sorbent material, and the feed system discussed above may either be gravity, pneumatic or chemical or a combination of two or more of these techniques.

The sorbent injection system of the present invention has several advantages. For example, it enables sorbent of varying particle sizes to be introduced into the reactor and a greater variety of fuels to be used. Also, it minimizes the amount of flyash produced in the reactor and enables the ratio of adsorbent between the bed and the upper furnace/combustor to be varied to improve operational characteristics. Further, it permits faster start-ups and load changes, and avoids chemistry problems by offsetting the chemical balance in the bed. Finally, it enables the solids inventory in the furnace combustor to be adjusted rapidly as demanded by the operational requirements.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fluidized bed reactor comprising a furnace section; means in said furnace section for supporting a bed of solid particulate material including fuel; means for introducing air into said bed at a velocity sufficient to fluidize said particulate material and support the combustion of said fuel; a separating section; means for directing to said separating section a mixture of said air, the gaseous products of said combustion, and the particulate material entrained by said air and said gaseous products of combustion; said separating section separating the particulate material from said mixture; means connecting said separating section to said furnace section for returning the separated particulate material back to said bed; a first supply source for supplying relatively coarse sorbent material; a second supply source for supplying relatively fine sorbent material; means for introducing said relatively coarse sorbent material and said relatively fine sorbent material directly from said first and second supply sources into said furnace section at two separate locations, respectively; and means for introducing said relatively coarse sorbent material and said relatively fine sorbent material directly from said first and second supply sources respectively to said connecting means.

2. The system of claim 1 wherein said second supply source comprises crushing means, and further comprising means for passing a portion of said relatively coarse sorbent material from said first supply source to said crushing means.

3. The system of claim 1 wherein said relatively coarse sorbent material is introduced directly from said first supply source into said furnace section at at least two separate locations, and said relatively fine sorbent material is introduced directly from said second supply source into said furnace section at at least two additional separate locations.

* * * * *